(12) United States Patent
Miyamae et al.

(10) Patent No.: US 7,068,889 B2
(45) Date of Patent: Jun. 27, 2006

(54) OPTICAL COMMUNICATION MODULE, OPTICAL COMMUNICATIONS APPARATUS, AND MANUFACTURING METHOD THEREOF

(75) Inventors: Akira Miyamae, Fujimi-cho (JP); Kimio Nagasaka, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 10/792,894

(22) Filed: Mar. 5, 2004

(65) Prior Publication Data
US 2004/0223703 A1 Nov. 11, 2004

(30) Foreign Application Priority Data
Mar. 5, 2003 (JP) ............................... 2003-059099

(51) Int. Cl.
*G02B 6/30* (2006.01)
*G02B 6/12* (2006.01)
*G02B 6/38* (2006.01)
*G02B 6/36* (2006.01)

(52) U.S. Cl. ............................ 385/49; 385/14; 385/70; 385/88; 385/90

(58) Field of Classification Search ................ 385/88, 385/14, 70, 90, 49
See application file for complete search history.

(56) References Cited

U.S. PATENT DOCUMENTS

| | | | | |
|---|---|---|---|---|
| 4,741,595 | A | 5/1988 | Onoda et al. | 385/120 |
| 5,250,469 | A * | 10/1993 | Tanaka et al. | 29/840 |
| 5,533,159 | A * | 7/1996 | Okochi et al. | 385/93 |
| 6,695,492 | B1 * | 2/2004 | Ide et al. | 385/88 |
| 6,931,177 | B1 * | 8/2005 | Suzuki et al. | 385/33 |
| 2003/0026303 | A1 * | 2/2003 | Ouchi | 372/36 |
| 2004/0037507 | A1 * | 2/2004 | Marion et al. | 385/52 |

FOREIGN PATENT DOCUMENTS

| | | |
|---|---|---|
| JP | A 5-251717 | 9/1993 |
| JP | A 2000-349307 | 12/2000 |
| JP | A 2001-159724 | 6/2001 |
| JP | A 2002-250846 | 9/2002 |

* cited by examiner

*Primary Examiner*—Brian Healy
*Assistant Examiner*—Charlie Peng
(74) *Attorney, Agent, or Firm*—Oliff & Berridge, PLC (57) ABSTRACT

The invention provides a compact, inexpensive optical communication module with high product reliability. In particular, the invention can include an optical communication module having a substrate with a through-hole into which an optical fiber can be inserted and removed, a light-transmissive resin film disposed on one side of the substrate and covering the through-hole, an electrically conductive film patterned on top of the light-transmissive resin film, and an optical element connected to the electrically conductive film, positioned with reference to the through-hole, and disposed above the through-hole so that light can be transmitted and received through the through-hole, and, where necessary, encapsulated with a sealant.

12 Claims, 6 Drawing Sheets

OPTICAL COMMUNICATION MODULE, OPTICAL COMMUNICATIONS APPARATUS, AND MANUFACTURING METHOD THEREOF

CROSS-REFERENCE TO RELATED APPLICATION

The disclosure of Japanese Patent Application No. 2003-059099 filed Mar. 5, 2003 including the specification, drawings, and claims is incorporated herein by reference in its entirety.

BACKGROUND OF THE INVENTION

1. Field of Invention

The present invention relates to an optical communication module, such as an optical transmitter, an optical receiver, and an optical transceiver, and to a manufacturing method thereof. More specifically, the present invention relates to a highly reliable, compact, and inexpensive optical communication module and to a manufacturing method thereof.

2. Description of Related Art

An optical communications system essentially can include a light-emitting element that converts electrical signals to optical signals and a light-receiving element that converts optical signals to electrical signals. The light-emitting element and the light-receiving element are connected to one another by an optical fiber. An optical communication module (connector) is used to optically connect an optical element, such as a light-emitting element or a light-receiving element, to an optical fiber in a way that allows the optical element to be attached and detached and the optical fiber to be inserted and removed.

Most conventional optical transmitter modules include a light-emitting element packaged in a can package. The can package is secured to a printed circuit board and is connected to an external circuit. Input signals that drive the light-emitting element are sent from the external circuit to the light-emitting element via a metal terminal (pin). The light-emitting element is typically optically coupled to an optical fiber via a ball lens. The light emitted by the light-emitting element passes through the ball lens and is directed to the optical fiber, which is positioned using a sleeve in the module.

A conventional optical transmitter module, since it uses a can package that is connected to an external circuit via a metal pin, can be reduced in sized only so far. Moreover, conventional optical transmitter modules tend to be comparatively expensive to manufacture, because they comprise a large number of parts and their manufacture involves a large number of steps. Also adding to their expense is a time-consuming step for aligning these components.

Various methods have been explored to solve these problems. For example, related art discloses an optical communication module having a platform and an optical element, the platform having a through-hole for inserting an optical fiber, and the platform further having an electrically conductive layer formed thereon for facilitating the electrical connection with the optical element or external circuit. The optical communication module described in the related art can be miniaturized, because the platform does not use a can package, and positioning is achieved by the through-hole.

However, in the optical communication module described in the related art, a bump for connecting and securing the optical element has to be formed in the perimeter of the through-hole so that the optical element can be mounted above the through-hole in which the optical fiber is inserted. Consequently, the optical element is large and manufacturing cost is high. Moreover, a ferrule typically is connected to the tip of the optical fiber, to support the fiber and ensure alignment. Since, the diameter of the through-hole is widened to match the diameter of the ferrule, the diameter of the hole sometimes exceeds that of the optical element, thus making it impossible to mount the optical element. This type of optical communication module is a consumable supply and thus further reductions in cost are desirable.

The structure of this optical communication module does not lend itself to the addition of an impedance-matched transmission line, and thus there is a limit to driving in high-frequency bands. Hence, the development of an optical communication module that supports high-speed driving is desirable.

SUMMARY OF THE INVENTION

The present invention is intended to provide a highly reliable optical communication module that is both small and inexpensive. The present invention is also intended to provide an optical communication module capable of accommodating increasingly fast optical transmission speeds. Furthermore, the present invention is intended to provide a manufacturing method wherein a highly reliable optical communication module can easily be manufactured in high volume.

To achieve the aforementioned objectives, the optical communication module of the present invention can include a substrate having a through-hole in which a removable optical fiber is inserted, a light-transmissive resin film disposed on one side of the substrate and covering the through-hole, an electrically conductive film patterned on top of the light-transmissive resin film, and an optical element connected to the electrically conductive film, positioned with reference to the through-hole, and disposed above the through-hole so that light can be transmitted and received through the through-hole.

Since the aforementioned structure has a light-transmissive resin film over the through-hole of the substrate, an optical element having a diameter smaller than the diameter of the through-hole can be mounted over the through-hole, thus providing an inexpensive optical communication module. The light-transmissive resin film isolates the optical element from the optical fiber that is inserted into the through-hole and thus prevents outside air, moisture and other potentially harmful elements from reaching the optical element from the optical fiber insertion side. Moreover, since the optical element is placed and positioned with respect to the through-hole, the present invention provides an optical communication module that offers higher positional accuracy when the optical fiber is inserted in the through-hole than when the conventional can package is used.

The optical element in the optical communication module of the present invention may also, if necessary, be encapsulated with a sealant. An encapsulated structure keeps the optical element impermeable, to provide a highly reliable optical communication module. According to the present invention, moreover, since the optical element is disposed over a through-hole, with a light-transmissive resin film interposed therebetween, the optical element can be encapsulated on top of the light-transmissive resin film, and the optical fiber can be inserted after the optical element is encapsulated. Therefore, even when the optical fiber is inserted, the optical element is protected from outside air and moisture and, thus, a more reliable optical communication module can be provided.

The connecting portion between the optical element and the light-transmissive resin film is preferably located above the through-hole. Since the light-transmissive resin film is formed over the through-hole, an optical element that is smaller than the diameter of the through-hole may be mounted over the through-hole, thus reducing the cost of the product.

An electrically conductive layer may also be formed between the substrate and the light-transmissive resin film. Such a structure enhances design flexibility, because the electrically conductive layer formed between the substrate and the light-transmissive resin film can be patterned to form a circuit, for example.

The substrate may be a conductor. If the substrate is a conductor, and if the wiring takes the form of a microstrip line, for example, the substrate itself can be used as a grounding plate, so the manufacturing process can be simplified.

The light-transmissive resin film is preferably an electric insulator or a dielectric. Such a structure makes it possible to easily manufacture a microstrip line suited to transmissions in a high-frequency band.

The microstrip line is preferably formed on both sides of the light-transmissive resin film, as such a structure reduces transmission loss in a high-frequency band, and can thus provide an optical communication module suited to high-speed driving of the optical element.

The thickness of the area on the light-transmissive resin film where the microstrip line is formed is preferably determined by the impedance matching of the microstrip line and the optical element and the optical loss due to optical absorption by the light-transmissive resin film. Such a structure reduces variations in impedance and enables an optical communication module that has little optical loss and high reliability.

The light-transmissive resin film is preferably a polyimide film, and the optical element is preferably a surface-emitting laser. An optical communication module with such a structure has little optical loss and is compact, because the polyimide film has good optical transmissivity, and the surface-emitting laser enables the module to be scaled down.

An optical communications apparatus of the present invention comprises the aforementioned optical communication module, an optical fiber, and an external board on which is formed an external circuit. The optical fiber is inserted into a through-hole in the substrate of the optical communication module. The optical fiber is then fixed with respect the substrate. The optical element included in the optical communication module can be electrically connected to the external circuit for controlling the driving of the optical element.

An optical communications apparatus with such a structure can be manufactured inexpensively and with high accuracy, since it uses an optical communication module such as that described above.

The method of manufacturing an optical communication module of the present invention can include placing an optical element on a substrate having one or a plurality of through-holes, the optical element mounted over a through-hole and a thin film interposed therebetween. The optical element is mounted while the surface of the thin film opposite the surface on which the optical element is placed is supported by a support member provided in the through-hole.

Since the light-transmissive resin film (a thin film) is supported from the back side when the optical element is mounted in place on the light-transmissive resin film, the light-transmissive resin film is protected from strain, distortion and damage. Also, since the optical element can be mounted on top of the light-transmissive resin film, the optical element can be smaller than the through-hole. Therefore, an inexpensive optical communication module can be manufactured with high yield.

The aforementioned support member may be formed by filling the through-hole with a coadjuvant that is allowed to harden, or the support member may be a jig. Using a coadjuvant as the support member enhances design flexibility, since the coadjuvant can be used to fill any shape of through-hole without allowing gaps to form. A jig, on the other hand, since it can be used repeatedly, may reduce manufacturing costs.

A method of manufacturing an optical communication module of the present invention can include filling a through-hole in a substrate having one or a plurality of through-holes with a coadjuvant, forming a light-transmissive resin film on one side of the substrate, forming a wiring pattern from an electric conductor on the light-transmissive resin film, mounting an optical element so that it connects to the wiring pattern, and removing the coadjuvant from the substrate.

Since the light-transmissive resin film is supported from the back side when the optical element is mounted in place on the light-transmissive resin film, the light-transmissive resin film is protected from strain, distortion and damage. Also, since an optical element can be mounted on top of the light-transmissive resin film, the optical element can be smaller than the through-hole. In addition, most of the assembly steps for the optical communication module can be batch-processed together on a single substrate. These factors combine to enable an optical communication module to be manufactured inexpensively and with high yield.

A method of manufacturing an optical communication module of the present invention can include inserting a jig into a through-hole in a substrate having one or a plurality of through-holes, forming a light-transmissive resin film on one side of the substrate, forming a wiring pattern from an electric conductor on the light-transmissive resin film, mounting an optical element so that it connects to the wiring pattern, and removing the jig from the substrate.

Manufacturing costs can be reduced by repeatedly reusing the jig that is inserted into the through hole.

A method of manufacturing the optical communication module preferably can include attaching a light-transmissive resin film having a microstrip line formed thereon to one side of the substrate; mounting an optical element so as to connect to the wiring pattern, and removing the jig from the substrate. Such a structure simplifies the manufacturing process.

The step wherein the jig is inserted in the through-hole preferably includes fixing the inserted jig to the substrate. Fixing the jig to the substrate makes it possible to prevent damage to the light-transmissive resin film caused by a shift in the position of the jig.

The manufacturing method may also include a step wherein the substrate is cut and separated either before or after the jig is removed. If the jig is to be removed after the substrate is cut, there is no need to set up a separate step for preventing contamination of the through-hole by water, oil or other material used during substrate cutting. By obviating such a step, the manufacturing process can be simplified, and manufacturing costs can be reduced. Conversely, if the jig is removed before the substrate is cut, the manufacturing process can be simplified since the jig can be extracted from all through-holes at the same time, and manufacturing costs can be reduced because the jig can be reused.

A method of manufacturing an optical communication module of the present invention can include setting a plurality of substrates having one or a plurality of through-holes onto a jig having a plurality of projections so that the through-hole snugly fits the projection, fixing the substrates in place by filling gaps between the plurality of substrates with resin, forming a light-transmissive resin film on the surface of the substrate opposite the surface attached to the jig, forming a wiring pattern from a conductor on top of the light-transmissive resin film, mounting an optical element so that it is connected to the wiring pattern, and removing the jig from the substrate.

The aforementioned manufacturing method lowers manufacturing costs because a substrate having through-holes corresponding to the plurality of projections on the jig can be installed on the jig in one step, and the substrate can later be removed in smaller pieces. Hence, the jig does not have to be cut and can be reused repeatedly.

A method of manufacturing an optical communication module can include setting a plurality of substrates having one or a plurality of through-holes onto a jig having a plurality of projections so that the through-hole snugly fits the projection; fixing the substrates in place by filling gaps between the plurality of substrates with resin, attaching a light-transmissive resin film having a microstrip line formed thereon to the side of the substrate opposite the side to which the jig is attached, mounting an optical element so as to connect to the wiring pattern, and removing the jig from the substrate. Such a structure simplifies the manufacturing process.

The aforementioned manufacturing method may also include forming an electrically conductive layer between the substrate and the light-transmissive resin film. Such an electrically conductive layer enhances design freedom, because a circuit pattern can be formed between the substrate and the light-transmissive resin film.

The substrate is preferably a conductor. Such a structure enables the manufacturing process to be simplified, since the substrate itself can be used as a grounding plate if a circuit pattern is formed using a microstrip line.

The light-transmissive resin film is preferably an electric insulator or a dielectric. Such a structure makes it possible to easily manufacture a microstrip line suited to transmissions in a high-frequency band.

The thickness of the light-transmissive resin film is preferably determined by the impedance matching of a microstrip line formed on both sides of the light-transmissive resin film and the optical element and the optical loss due to optical absorption by the light-transmissive resin film. Such a structure reduces variations in impedance and enables the manufacture of an optical communication module that has little optical loss and high reliability.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Preferred embodiments of the present invention are described below while referring to FIG. 1 through FIG. 7.

Figure 1:
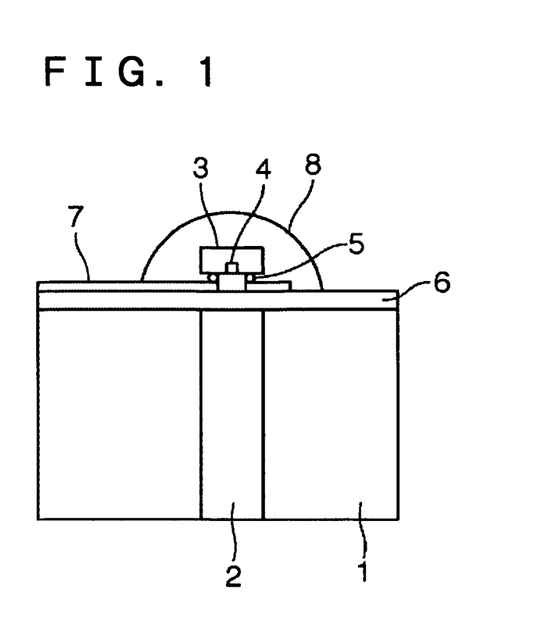
FIG. 1 is a sectional view of an optical communication module according to a first exemplary embodiment.

FIG. 1 is a sectional view of an optical communication module according to a first exemplary embodiment. As shown in FIG. 1, an optical communication module according to the present embodiment is comprised primarily of a substrate 1 having a through-hole 2, a light-transmissive resin film 6, and an optical element 3.

Figure 3:
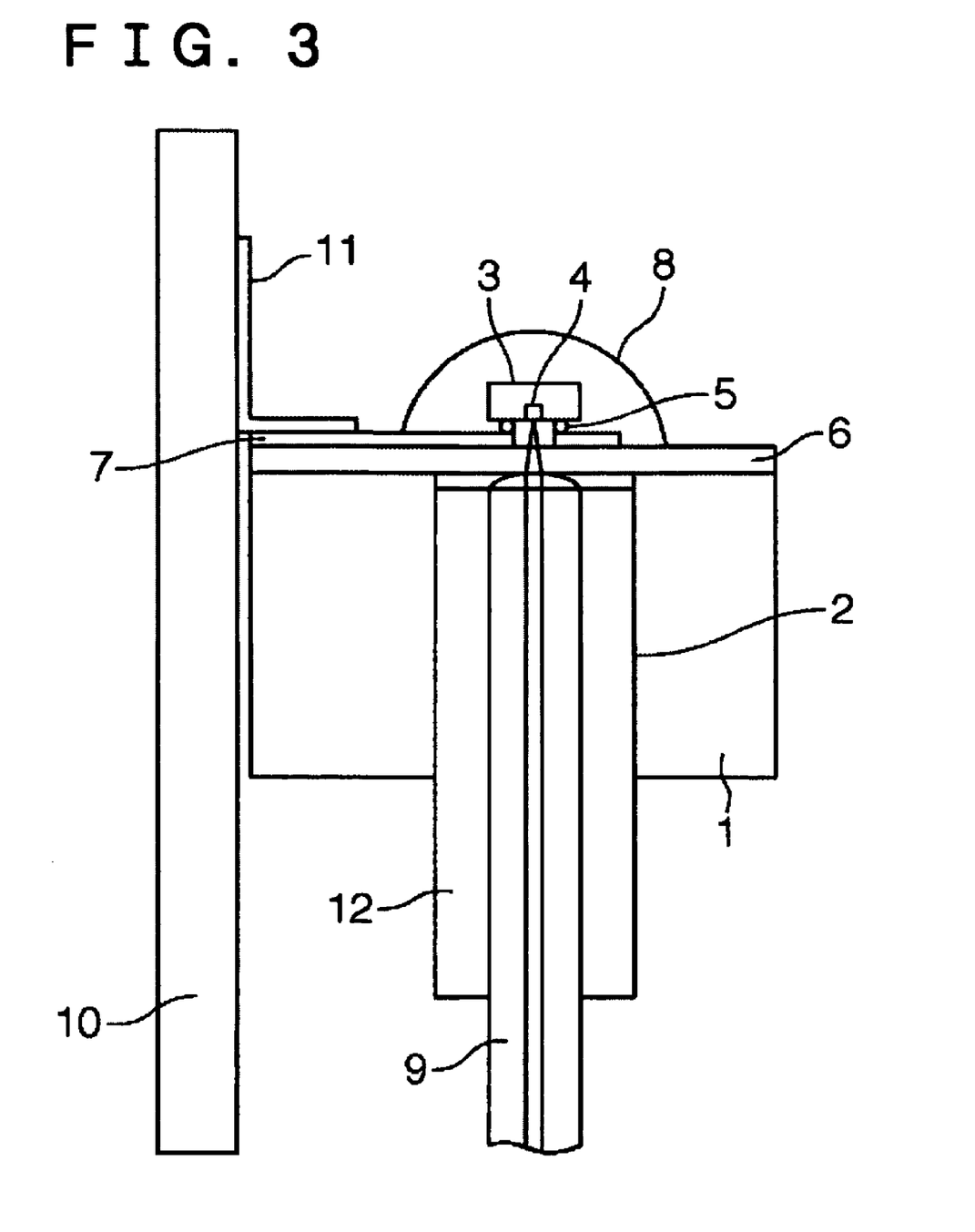
FIG. 3 illustrates one aspect of the optical communications apparatus according to the present invention.
Figure 4:
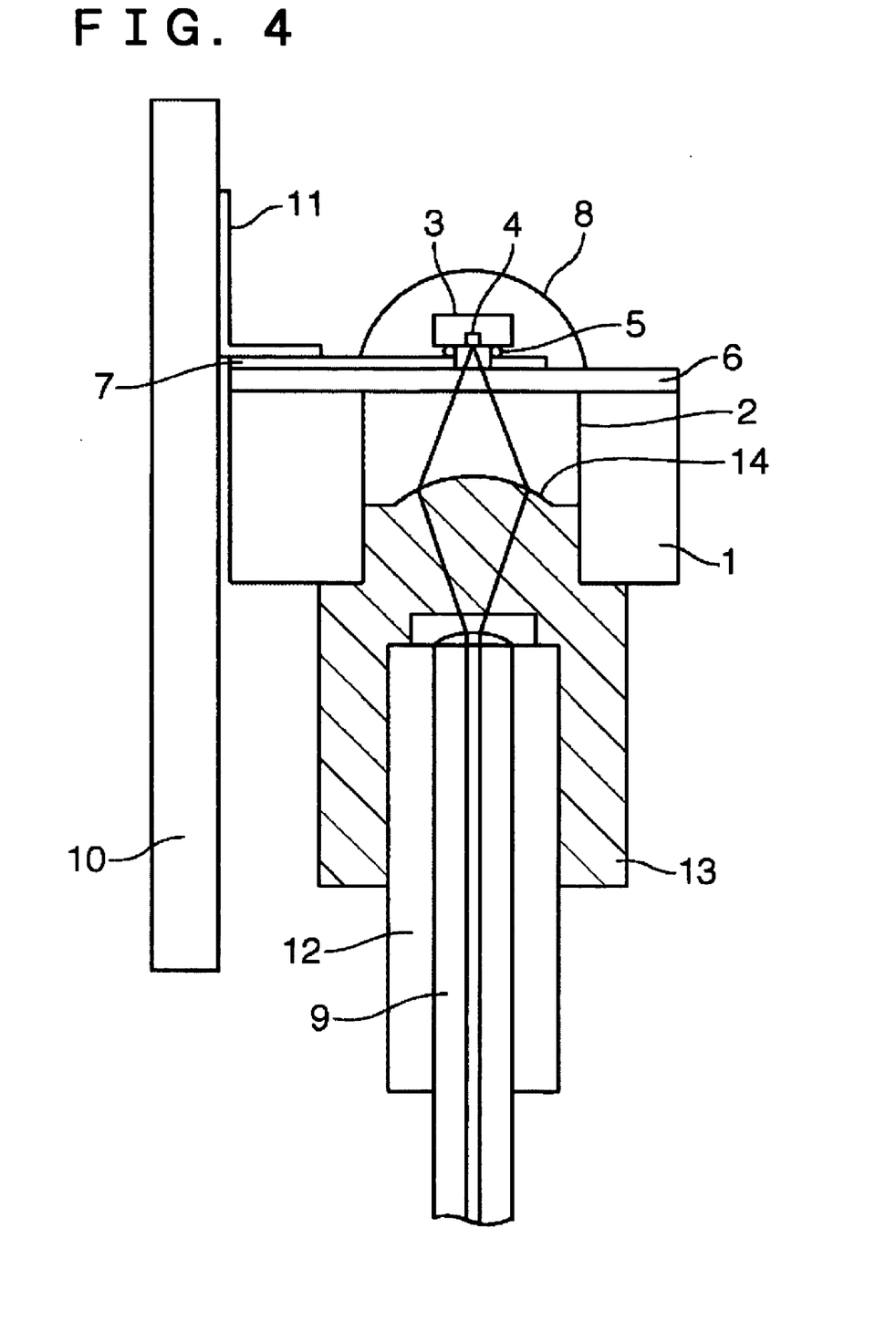
FIG. 4 illustrates one aspect of the optical communications apparatus according to the present invention.
Figure 5A:
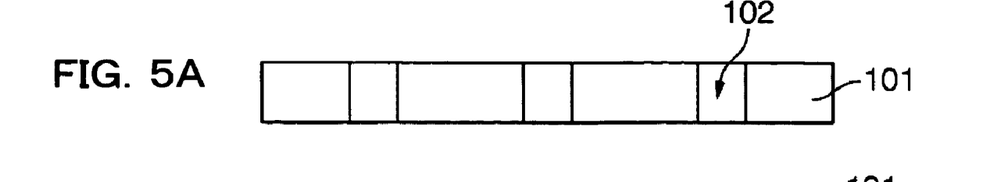
FIG. 5 is used to describe the method of manufacturing the optical communication module according to the first exemplary embodiment.
Figure 5B:
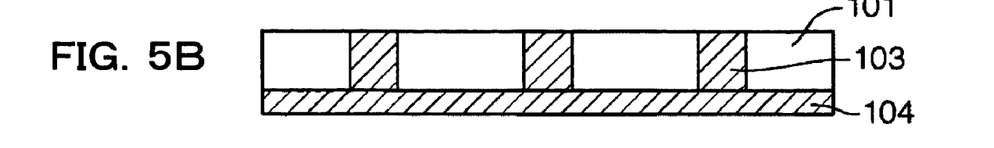
Figure 5C:
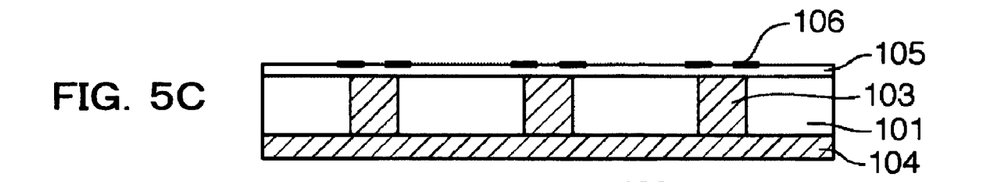
Figure 5D:
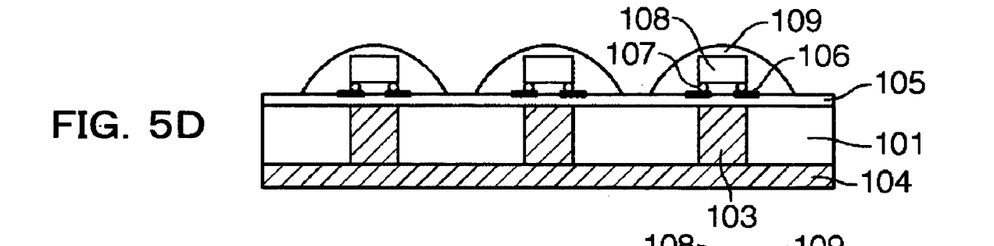
Figure 5E:
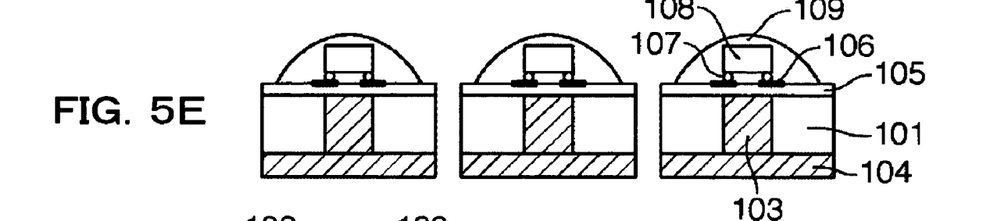
Figure 5F:
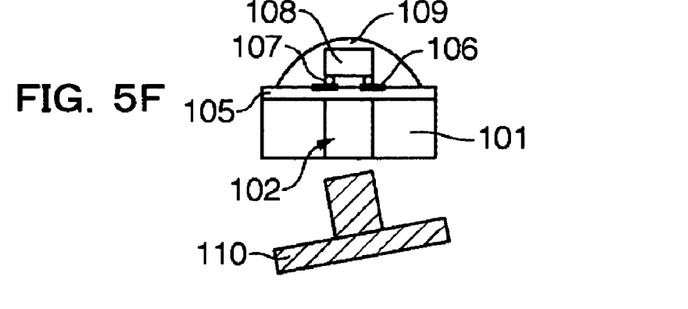
Figures 6A, 6B:
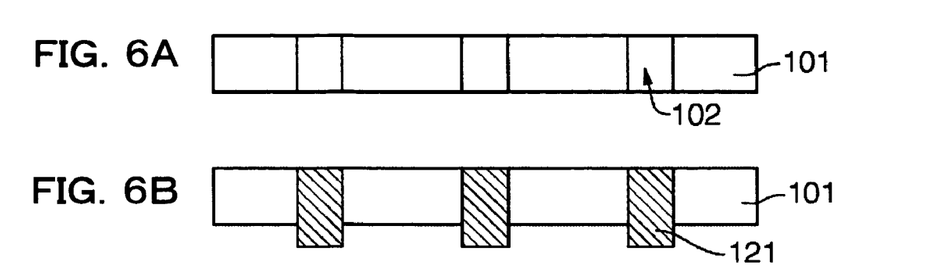
FIG. 6 is used to describe another method of manufacturing the optical communication module according to the first exemplary embodiment.
Figure 6C:
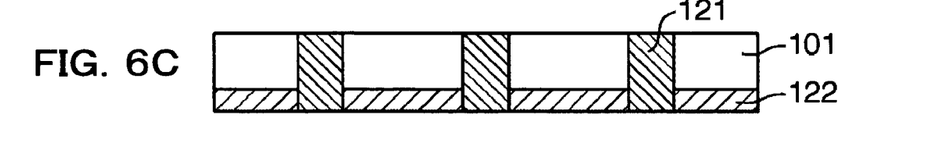
Figure 6D:
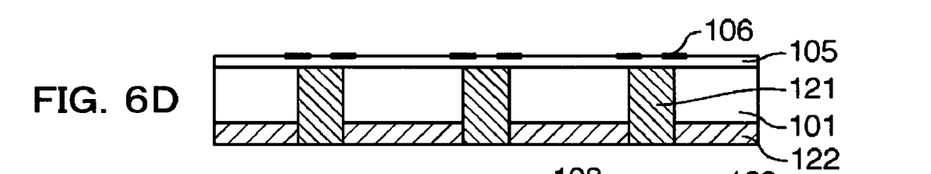
Figure 6E:
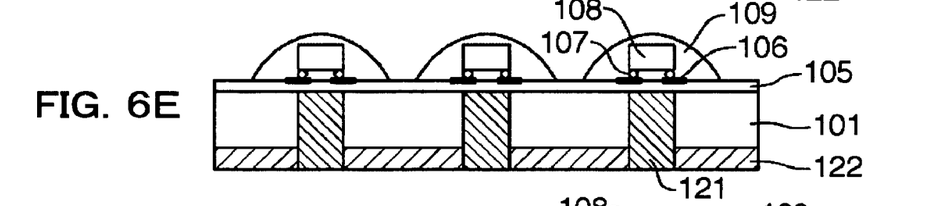
Figure 6F:
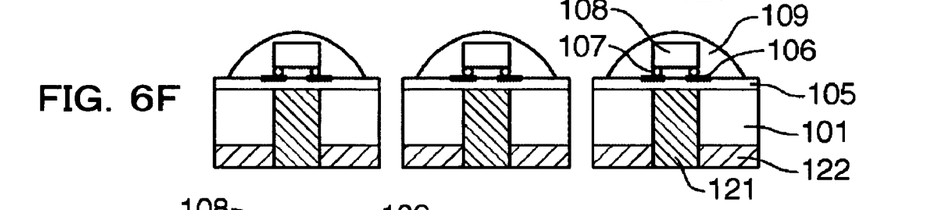
Figure 6G:
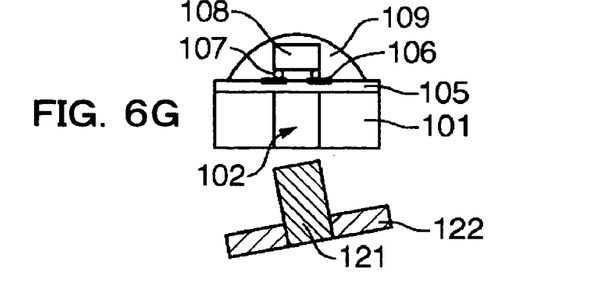
Figure 7A:
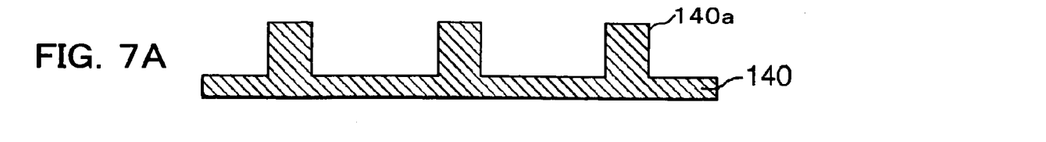
FIG. 7 is used to describe another method of manufacturing the optical communication module according to the first exemplary embodiment.
Figure 7B:
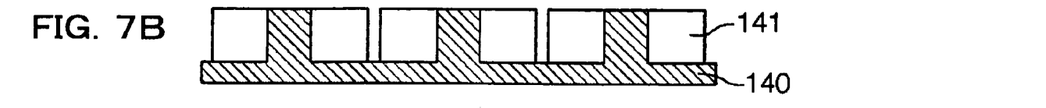
Figure 7C:
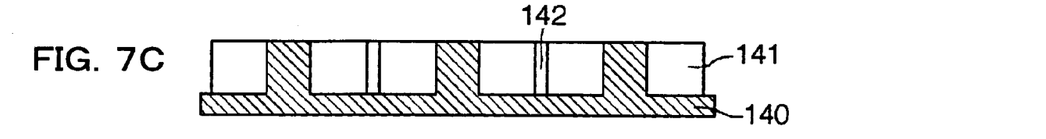
Figure 7D:
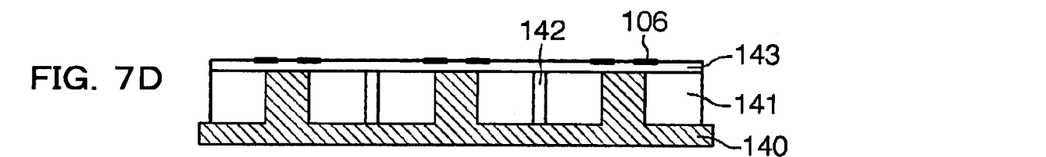
Figure 7E:
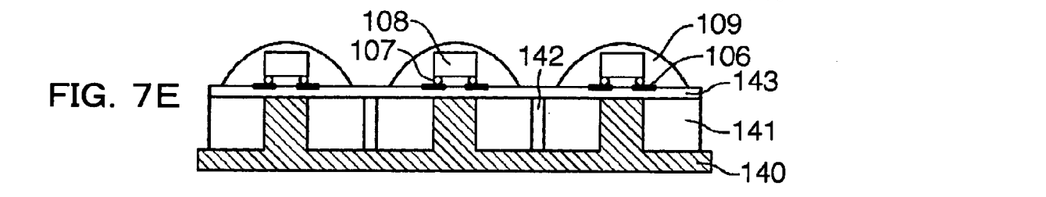
Figure 7F:
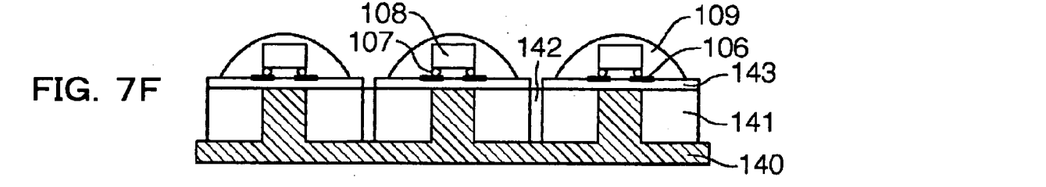
Figure 7G:
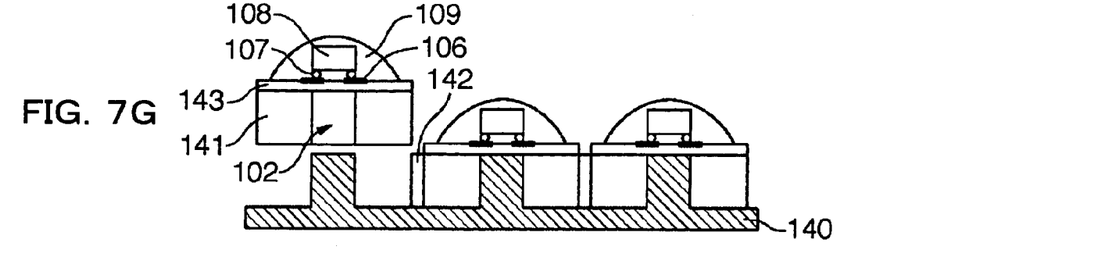

The through-hole 2 formed in the substrate 1 allows an optical fiber (not shown) to be inserted and removed. The through-hole 2 is preferably shaped such that essentially no gap remains when an optical fiber is inserted into it, thus fixing the optical fiber in place. If a ferrule or a sleeve is attached to the optical fiber (as shown in FIG. 3 and FIG. 4, respectively), the through-hole 2 is preferably of a diameter capable of securing the ferrule or sleeve and is shaped such that the ferrule or sleeve fits snugly without leaving a gap. The substrate 1 may, for example, be made of stainless steel, aluminum, copper or some other conductive material. Alternatively, a non-conductive material such as a resin or a ceramic may be used. If a microstrip line for enabling high-speed driving is to be formed on the substrate, the substrate 1 is preferably a conductor. The conductive substrate 1 can be used as a ground potential, making the formation of a microstrip line easier.

A light-transmissive resin film 6 is formed on the substrate 1. The light-transmissive resin film 6 may be formed from, for example, a polyimide, an epoxy resin, or some other resin that transmits light. A polyimide film is preferable in that it has good transmissivity, is flexible, and has good handling properties.

A wiring pattern 7 of a conductor metal, such as copper is formed on the light-transmissive resin film 6. An optical element 3—a light-emitting element, such as a VCSEL or a light-receiving element, such as a photodiode—is formed on this wiring pattern 7 to connect it by, for example, flip-chip bonding so that the light-emitting element or light-receiving portion 4 faces the through-hole 2. Where a light-emitting element is used for the optical element 3, it is preferable to use a surface-emitting laser such as a VCSEL. A surface-emitting laser enables the size of the element to be reduced, thus enabling a compact optical communication module with little optical loss.

The optical element 3 is disposed above the through-hole 2, the light-transmissive resin film 6 and the wiring pattern 7 interposed therebetween. A bump 5 that serves to connect the optical element 3 to the wiring pattern 7 is disposed such that the optical element 3 is located above the through-hole 2. The entire optical element 3 is encapsulated with a sealant 8. If necessary, an underfill agent (not shown) may be injected between the optical element 3 and the light-transmissive resin film 6.

In the present embodiment a wiring pattern 7 is disposed on the light-transmissive resin film 6, but other embodiments are also possible. For example, an electrically conductive layer made of a metal, such as stainless steel, aluminum, or copper may be formed between the light-transmissive resin film 6 and the substrate 1, and a microstrip line may be formed as this electrically conductive layer being ground potential. If the substrate 1 is a conductor, the microstrip line may be formed as the substrate 1 being ground potential. Forming a microstrip line prevents transmission loss at high frequency.

If a microstrip line is formed on a light-transmissive resin film, the thickness of the film in the area where the microstrip line is formed is determined by the balance between the impedance matching of the microstrip line and optical element and the optical loss due to optical absorption by the light-transmissive resin film.

As a specific example, if the input impedance of the optical element is 50 Ω, then the characteristic impedance $Z_0$ (Ω) of the microstrip line is also preferably 50 Ω, as it is preferably matched to the input impedance of the optical element. The microstrip line's characteristic impedance $Z_0$ (Ω) is found using the formula below, where B (mm) is the width of the transmission line, C (mm) is the line thickness, H (mm) is the distance between the transmission line and ground, and $\epsilon r$ is the relative permittivity of the light-transmissive resin film 105, which serves as a dielectric layer.

$$Z_0 = (87/(\epsilon r + 1.41)^{1/2}) \times \ln(5.98H/(0.8B+C))$$

If a polyimide is used as the light-transmissive resin film 6, the relative permittivity would be 3.4 and, according to the above formula, if H=0.05, B=0.09, and C=0.012, for example, then the impedance of the microstrip line would be approximately 50 Ω. Hence, a microstrip line of these dimensions can be used.

Although the present embodiment has one through-hole 2 for inserting an optical fiber, it will be appreciated that it may also have a plurality of through-holes. Providing a plurality of through-holes enables an optical communication module that supports a multi-channel system or an optical communication module with integrated transmitter-receiver.

The aforesaid structure provides a highly reliable optical communication module, since the optical element is protected by a sealant at the time the optical fiber is inserted. The sealant, which encapsulates the optical element, is formed on the light-transmissive resin film, which itself is formed on one side of the substrate such that it covers the through-hole. This optical communication module can also be produced at lower cost, because the optical element, since it is disposed on the light-transmissive resin film, does not have to be increased in size to match a larger diameter of through-hole for inserting the optical fiber. Moreover, this optical communication module offers outstanding accuracy, because after the optical element is placed on the light-transmissive resin film, the position of the optical element is adjusted and then locked in place with the sealant.

Such an optical communication module may also be used to form an optical communications apparatus that is connected with an outside circuit disposed on an external substrate. The optical communications apparatus is described below.

FIGS. 5 (a)–(f) are used to describe the method of manufacturing the optical communication module according to the present embodiment. The method of manufacturing the optical communication module according to the present embodiment is explained while referring to the aforementioned figures.

First, a through-hole 102, either singular or a plurality thereof, is formed in a substrate 101 (FIG. 5 (a)). The through-hole 102 may be round, for example, and an optical fiber can be inserted therein. The through-hole 102 is preferably of a size that leaves essentially no gap when the optical fiber or a ferrule connected to the optical fiber is inserted into the through-hole 102, since a snug fit makes it easier to position the optical fiber with respect to the optical element. The substrate 101 is preferably made of a conductor, such as stainless steel, aluminum, or copper, for example. This is because in order to accommodate high-speed driving, a microstrip line is preferably formed on the substrate, and if a conductor is used for the substrate 101, the substrate 101 can be used as the ground potential. The substrate 101 may also be made of a non-conductive material, such as a resin or a ceramic. If made of a non-conductive material, the substrate 101 can be given ground potential by forming an electrically conductive film on the surface of the substrate 101.

The through-hole 102 thus formed is filled with a coadjuvant, as illustrated in FIG. 5 (b). Here, the coadjuvant should be a substance that, when it fills the through-hole 102, is capable of supporting the light-transmissive resin film 105 formed thereafter, so that the light-transmissive resin film 105 is not damaged when the optical element is placed on the light-transmissive resin film 105. A thermosetting resin, such as an epoxy resin, for example, may be used as the coadjuvant. Specifically, after the through-hole 102 is filled with the epoxy resin or other thermosetting resin, the resin is thermally set, thereby forming the support member 103. Moreover, the support material coadjuvant is simultaneously used to form a film 104 on one side of the substrate 101. The film 104 disposed on the substrate 101 may be made of the same support material as the support member 103 or may be made of a different coadjuvant. The support member 103 and the film 104 may be formed at the same time, or they may be formed in different steps. However, from the standpoint of ease in later removing the coadjuvant from the through-hole 102, the film 104 and support member 103 are preferably made of the same material and are preferably formed in one piece.

A light-transmissive resin film 105 is formed on the surface opposite that on which the film 104 of the substrate 101 is formed. An electrically conductive film, such as copper, for example, is then formed over the light-transmissive resin film 105 by sputtering or by bonding a copper foil or the like. The electrically conductive film is then patterned in a photolithography step and an etching step, to form a wiring pattern 106, as shown in FIG. 5 (c).

Provided that it is an optically transmissive resin, the material used for forming the light-transmissive resin film 105 is not specifically prescribed, and may be, for example, a polyimide, an epoxy resin, or the like. If a polyimide is used, the light-transmissive resin film 105 can be formed by, for example, coating the substrate 101 with a predetermined monomer to a predetermined thickness, and then heat-curing and hardening the monomer. Prior to forming the light-transmissive resin film 105, the surface of the substrate 101 may, if necessary, be planarized by polishing, for example.

A microstrip line is preferably formed as a wiring pattern 106. If a conductor, such as stainless steel is used for the substrate 101, a microstrip line can be formed with the substrate 101 as the reference potential (ground potential). The use of a microstrip line allows impedance to be matched and prevents transmission loss at a high-frequency band, thus providing a transmission line at a high-frequency band.

Next, an optical element 108 is attached to the substrate 101 on which the wiring pattern 106 is formed, a shown in FIG. 5 (*d*). The optical element 108 may be, for example, a vertical-cavity surface-emitting laser (VCSEL), which may be joined to the substrate 101 by flip-chip bonding. In FIG. 5 (*d*), the optical element 108 is bumped with a solder bump 107.

In the aforesaid steps (c) and (d), the through-hole 102 in the substrate 101 is used as a reference to adjust the alignment of the wiring pattern during formation and of the optical element 108 during mounting. Using the through-hole 102 as a reference makes it easier to adjust the optical axis of the optical element with respect to the optical fiber.

If a light-emitting element, such as a VCSEL is used as the optical element 108, a drive circuit (a laser driver for example) for driving the light-emitting element may, if necessary, be simultaneously mounted. In the present embodiment, the through-hole 102 is filled with a coadjuvant as described above. The coadjuvant keeps the light-transmissive resin film 105 stationary and preventing the resin film from deforming, breaking or incurring other damage when the optical element 108 is mounted on it. Hence, the optical element 108 can be reliably placed over the through-hole 102, with the light-transmissive resin film 105 interposed.

In addition, a transparent underfill agent (not shown) is infiltrated between the optical element 108 mounted as described above and the light-transmissive resin film 105. After the underfill agent 105 is hardened, the entire optical element is encapsulated with a sealant 109, such as an epoxy resin, for example. While the underfill agent is not specifically prescribed, it is preferably made of a material having a refractive index essentially equal to that of the light-transmissive resin film 105 so as to prevent reflections at the boundary of the light-transmissive resin film 105. Hence, if a polyimide, for example, is used to form the light-transmissive resin film 105, then a light-transmissive epoxy resin having a refractive index close to that of the polyimide may be used as the underfill agent.

The substrate 101 with the optical element 108 thus encapsulated is cut vertically and horizontally into smaller pieces with a dicer, for example, as indicated in FIG. 5 (*e*).

The member 110 formed by the uniting of the support member 103 and the film 104 is removed from the individual small pieces of the substrate 101, as indicated in FIG. 5 (*f*).

In the present embodiment, the member 110 is removed after the substrate 101, so as to prevent contamination of the optical communication module by, for example, particulates created or oil used when the substrate 101 is cut. However, if other measures for preventing contamination are taken, the member 110 formed by the union of the support member 103 and the film 104 may be removed before the substrate 101 is cut. If the jig is removed before the substrate is cut, manufacturing costs can be reduced. Since the jig can be extracted from all through-holes at the same time, the manufacturing process is simplified and the jig can be reused.

In the aforementioned step (c), the light-transmissive resin layer 105 is formed by coating the substrate 101 with a light-transmissive resin. Instead of coating the substrate 101 with a light-transmissive resin, however, a polyimide film or other film may be laminated to the substrate 101 to serve as the light-transmissive resin layer 105. The process can be further simplified by using a polyimide film or other flexible printed circuit (FPC) that has a microstrip line preformed on both sides.

In the example described above, a VCSEL is used as the light-emitting element, but an edge-emitting laser, for example, may also be used. Moreover, a light-receiving element, such as a photodiode may be used instead of a light-emitting element, in which case a light-receiving module is created.

Also, in step (e) above, the substrate 101 was diced so that each smaller substrate is equipped with one through-hole 102. However, the substrate 101 may also be diced so that one smaller substrate has a plurality of through-holes 102. By providing a plurality of through-holes 102, it is possible to create an optical communication module that supports a multi-channel system or an optical communication module with an integrated transmitter-receiver.

The foregoing structure enables an inexpensive optical communication module, because the through-hole 102 is filled with a coadjuvant that immobilizes and protects the light-transmissive resin film 105, and thus an optical element that is smaller than the diameter of the through-hole 102 can be mounted over the through-hole 102. The light-transmissive resin film 105 is supported from the back side during the mounting of the optical element. Thus, even if the light-transmissive resin film 105 is thin, the light-transmissive resin film 105 is protected from strain, distortion and damage. Consequently, an optical communication module can be produced with a high yield, because the distance between the optical element 108 and the optical fiber can be reduced and, moreover, the loss of light due to optical absorption by the light-transmissive resin film 105 can be reduced. In addition, a large volume of optical communication modules can be formed at one time, thus lowering manufacturing costs.

FIGS. 6 (*a*)–(*g*) are used to describe another method of manufacturing the optical communication module according to the present embodiment. According to the manufacturing method shown in FIG. 5, the through-hole 102 provided in the substrate 101 is filled with a coadjuvant, to form a support member 103. The support member 103 supports the light-transmissive resin film 105 while the optical element 108 is mounted in place thereon. In contrast, according to the manufacturing method shown in FIG. 6, instead of filling the through-hole 102 with a coadjuvant, a jig 121 is inserted. The jig 121 is used to support the light-transmissive resin film 105 while the optical element is being mounted in place thereon.

The method illustrated in FIG. 6 is identical to that shown in FIG. 5, except that steps (b) and (c) in FIG. 6 are performed instead of step (b) in FIG. 5.

According to the step illustrated in FIG. 6(*b*), a jig 121 is inserted into the through-hole 102 provided in the substrate 101. The jig 121 is longer than the through-hole 102 is deep. The jig 121 is aligned so that one end of the jig 121 members is coincident with the plane of one major surface of the substrate 101. The jig 121 preferably fits snugly in the through-hole 102, essentially without leaving any space. The end of the jig 121 may be flat, in which case a light-transmissive resin film 105 can be formed into a film having a flat and smooth surface. A light-transmissive resin layer 105 that is flat and smooth inhibits the scattering of light incident on the film when light is transmitted between the optical fiber and the optical element 108, thus preventing optical transmission loss.

The material of the jig 121, which is removed after the optical element 108 is mounted on the light-transmissive resin film 105, is not specifically prescribed. However, the jig 121 made of metal, for example, is preferable in that it is easily extracted from the substrate 101 and, moreover, readily detaches from the light-transmissive resin film 105.

In the step illustrated in FIG. 6 (c), the tips of the jig 121 protruding from the through-holes 102 are immobilized by a resin layer 122. The resin layer is preferably formed to a height that is equal to or higher than the height of the protruding tip of the jig 121. The tips of the jig 121 need to be thus immobilized because if the tips of the jig 121 protrude from the substrate 101, the jig 121 could break through the light-transmissive resin film if a load were applied to the substrate 101.

The steps illustrated in FIGS. 6 (d)–(g) may be performed in a manner identical to that described above for FIGS. 5 (c)–(f). Naturally, as in the manufacturing method described with reference to FIG. 5, it is preferable to use a flexible printed circuit (FPC) that has a microstrip line preformed on both sides, as the manufacturing process can thus be further simplified.

The structure described above provides the same benefits as those explained for the manufacturing method depicted in FIG. 5. In addition, the jig 121 for supporting the light-transmissive resin film can be reused repeatedly, thus lowering costs.

FIGS. 7 (a)–(g) are used to describe another method of manufacturing the optical communication module according to the present embodiment.

A jig 140 such as that illustrated in FIG. 7 (a) is readied. The jig 140 has cylindrical protrusions 140a that are regularly arrayed lengthwise and crosswise across the top of a substrate. A substrate 141 having a through-hole is fit onto each of a plurality of protrusions 140a on the jig 140.

The gaps between the substrates 141 on the jig 140 are filled with a thermoset resin 142, such as an epoxy resin, for example. After the resin is thermoset and the substrates are bonded together and immobilized, the surface is polished.

Later, the optical element 108 is mounted in the same manner as explained in the steps illustrated in FIGS. 5 (c) and (d), and the optical element 108 is encapsulated with a sealant 109 [FIGS. 7 (d)–(e)].

A light-transmissive resin 143 is cut, as shown in FIG. 7 (f), at the top portion of the resin 142 that fills the gaps between the substrates 141. The completed optical communication modules are then removed from the jig 140, as shown in FIG. 7 (g).

The manufacturing method described above provides the same benefits as those explained for the manufacturing method depicted in FIG. 5. In addition, the jig 140 is not cut and can be reused repeatedly. An optical communication module can be manufactured in large volumes in a simple process, thus lowering manufacturing costs.

Figure 2:
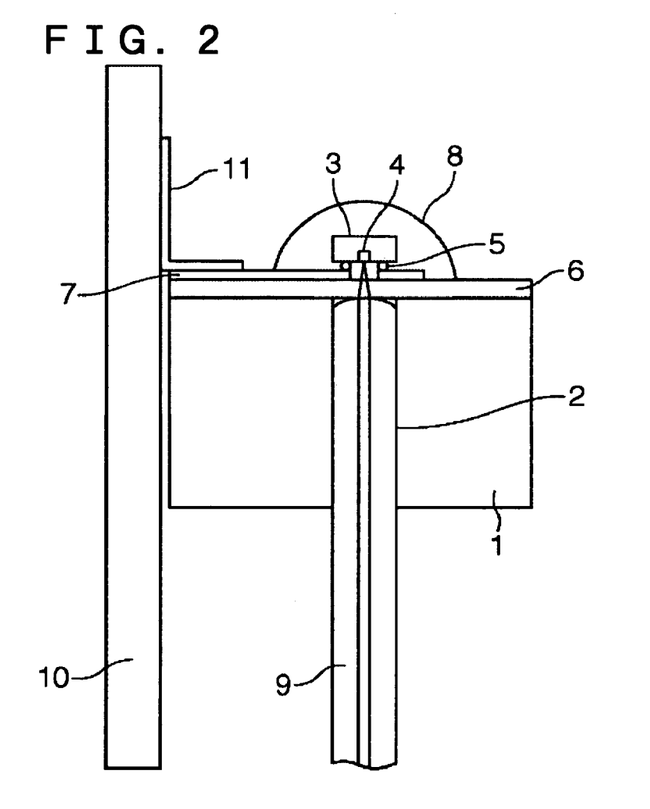
FIG. 2 illustrates one aspect of the optical communications apparatus according to the present invention.

FIG. 2 to FIG. 4 show several different aspects of an optical communications apparatus when an optical fiber is inserted into an optical communication module and when it is connected to an external circuit. The same numeral in different figures represents the same element. Elements already explained in FIG. 1 are not explained in the following description of FIG. 2 through FIG. 4.

FIG. 2 illustrates one example of an optical communications apparatus wherein an external circuit provided on an external substrate 10 and a wiring pattern formed on an optical communication module according to the present embodiment, an optical fiber 9 inserted therein, are connected by a connecting terminal 11.

The contact terminal 11 is attached so that it is electrically connected to the wiring pattern of the optical communication module. The contact terminal 11 is connected to the external board 10 by solder.

The optical fiber 9 is inserted into the through-hole 2 provided in the substrate 1 until it butts up against the light-transmissive resin film 6 (forms a butt-joint) and optical coupling with the optical element 3 is achieved. If a light-emitting element is used as the optical element, the light exiting the light emitting portion 4 of the light-emitting element passes through the light-transmissive resin film 6, enters the optical fiber 9, and is transmitted. The end of the optical fiber 9 may, as shown in FIG. 2, be lens-shaped.

FIG. 3 shows an example wherein the optical fiber 9, the end of which is fitted with a ferrule 12, is inserted into the through-hole 2 formed in the substrate 1, the size of the through-hole 2 made to match the diameter of the ferrule.

FIG. 4 shows an example wherein the optical fiber 9 is connected to the through-hole 2 formed in a first substrate via a sleeve with a lens on one end. The lens 14 of a lens sleeve 13 is formed on the surface of the sleeve, the surface opposite that where the cavity for optical fiber 9 insertion is formed.

Since the optical element 3 is thus formed on the light-transmissive resin film, even if an optical fiber 9, an optical fiber 9 equipped with the ferrule 12, or a large-diameter member such as a lens sleeve is inserted into the substrate 1, a small optical element 3 can still be used, thereby reducing the cost of the optical communications apparatus.

What is claimed is:

1. An optical communication module, comprising:
 a substrate having a through-hole in which a removable optical fiber is inserted;
 a light-transmissive resin film disposed on one side of the substrate and covering the through-hole;
 an electrically conductive film patterned on top of the light-transmissive resin film;
 an optical element coupled to the electrically conductive film, positioned with reference to the through-hole, and disposed above the through-hole so that light is transmitted and received through the through-hole; and
 a connecting portion between the optical element and the light-transmissive resin film that, when projected in a plane for plan view, is entirely located inside of a diameter of the through-hole.

2. The optical communication module of claim 1, further comprising:
 an electrically conductive layer formed between the substrate and the light-transmissive resin film.

3. The optical communication module of claim 1, the substrate being an electric conductor.

4. The optical communication module of claim 1, the light-transmissive resin film being one of an electric insulator or a dielectric.

5. The optical communication module of claim 1, a micro strip line being formed on both sides of the light-transmissive resin film.

6. The optical communication module of claim 1, a thickness of the light-transmissive resin film in a portion where a microstrip line is formed being determined by an impedance matching of the microstrip line and the optical element, and an optical loss due to optical absorption by the light-transmissive resin film.

7. The optical communication module of claim 1, the light-transmissive resin film being a polyimide film, and the optical element being a surface-emitting laser.

8. An optical communications apparatus, comprising:
the optical communication module of claim 1, an optical fiber, and an external board on which is formed an external circuit;
the optical fiber being inserted into a through-hole in the substrate included in the optical communication module, and being fixed with respect the substrate; and
the optical element included in the optical communication module and the external circuit that controls the driving of the optical element being electrically coupled.

9. The optical communication module of claim 1, the optical element having a dimension that is smaller than a dimension of the through-hole.

10. The optical communication module of claim 1, the optical element having a diameter smaller than a diameter of the through-hole.

11. The optical communication module of claim 1, the connecting portion being a first connecting portion, a distance between the first connecting portion and a second connecting portion being smaller than a diameter of the through-hole.

12. The optical communication module of claim 1, the light-transmitted resin film being a flexible printed circuit substrate.

* * * * *